United States Patent [19]
Saito

[11] Patent Number: 5,926,438
[45] Date of Patent: Jul. 20, 1999

[54] HAND-HELD LCD FISH FINDER

[75] Inventor: Shigeru Saito, Kyoto, Japan

[73] Assignee: Tose Co., Ltd., Kyoto, Japan

[21] Appl. No.: 09/075,337

[22] Filed: May 11, 1998

[30]     Foreign Application Priority Data

May 16, 1997   [JP]   Japan .................................... 9-004592

[51] Int. Cl.⁶ ............................. G01S 15/96; A63B 71/00
[52] U.S. Cl. ...................... 367/111; 367/107; 273/148 B; 463/44
[58] Field of Search .................................... 367/111, 107; 273/148 B; 463/43–44, 47

[56]              References Cited
          FOREIGN PATENT DOCUMENTS 3-126187  12/1991  Japan ............................... A63F 9/22
  4-21986    2/1992  Japan ............................... G01S 15/96
  5-196732   8/1993  Japan ............................... G01S 15/96

*Primary Examiner*—Ian J. Lobo
*Attorney, Agent, or Firm*—Snider & Chao; Ronald R. Snider

[57]              ABSTRACT

A hand-held LCD game machine is used as a hand-held LCD fish finder, in addition to its original game functions. Instead of a typical ROM game cassette, another device, which includes a cassette portion, a main body, and a float sensor having an ultrasonic transmitter, is inserted into the LCD game machine, so that the topography of the water bottom and the fish in water are displayed on a LCD panel by means of a program ROM having a memory to display the same based on an echo signal issued and received through the ultrasonic transmitter.

3 Claims, 9 Drawing Sheets

HAND-HELD LCD FISH FINDER

RELATED INVENTION

This application claims the priority of Japanese Utility Model Application No. 9-4592 (filed on May 16, 1997) which is expressly incorporated herein by reference in its entirety.

BACKGROUND OF THE INVENTION

In the prior art, a fish finder equipped with an ultrasonic transmitter has been well known. The prior art transmitter issues an acoustic wave into water and receives a counter echo which shows the existence of fish in the water.

On the other hand, a hand-held LCD (Liquid Crystal Display) game machine has been also very popular. This machine is operated with both thumbs of a player after a cartridge with its memory cell having a memory of a program data is inserted into the machine.

The prior fish finder in general is large in size and heavy in weight. Its operation is very complicated in use and also the finder is an expensive apparatus. These situations make it difficult for lovers of fishing to prepare a fish finder by themselves.

Accordingly, it has been for a long time desired by them that a new fish finder in light weight, inexpensive in price, and with easier operation shall be realized.

The hand-held LCD game machine is actually sold in a very competitive price, and its operation is far easier than that of the normal fish finder for everyone. Thus, everyone is becoming familiar with this kind of the machine and is willing to operate the same by himself.

SUMMARY OF THE INVENTION

This invention has an object to provide a hand-held LCD fish finder, wherein a function to indicate topography of a water bottom and an existence of fish in the water on its LCD display portion is established in addition to normal game functions.

In order to attain this object, the present invention has adopted the following constructions.

The fish finder developed by this invention is equipped with a fitting device for fish finding instead of a game cassette cartridge having a memory cell of program data for the game development. The fish finder fitting device is also equipped with a fish float wherein an ultrasonic transmitter is built in. In other words, the fish finder fitting device is composed of the memory cell having a memory of the program data with a function to find fish in the water. When an echo signal is received from the transmitter, the LCD display portion indicates the topography of the water bottom and fish thereof.

The invention, at the same time, provides that in this hand-held LCD fish finder, the fitting device having an ultrasonic transmitter, the fish float as a sensor and a cable which is covered with foamed plastic for floating over the water are all tightly connected to each other.

DESCRIPTIONS OF THE PREFERRED EMBODIMENT

The preferred embodiment is now explained with the offered drawings.

Figure 1:
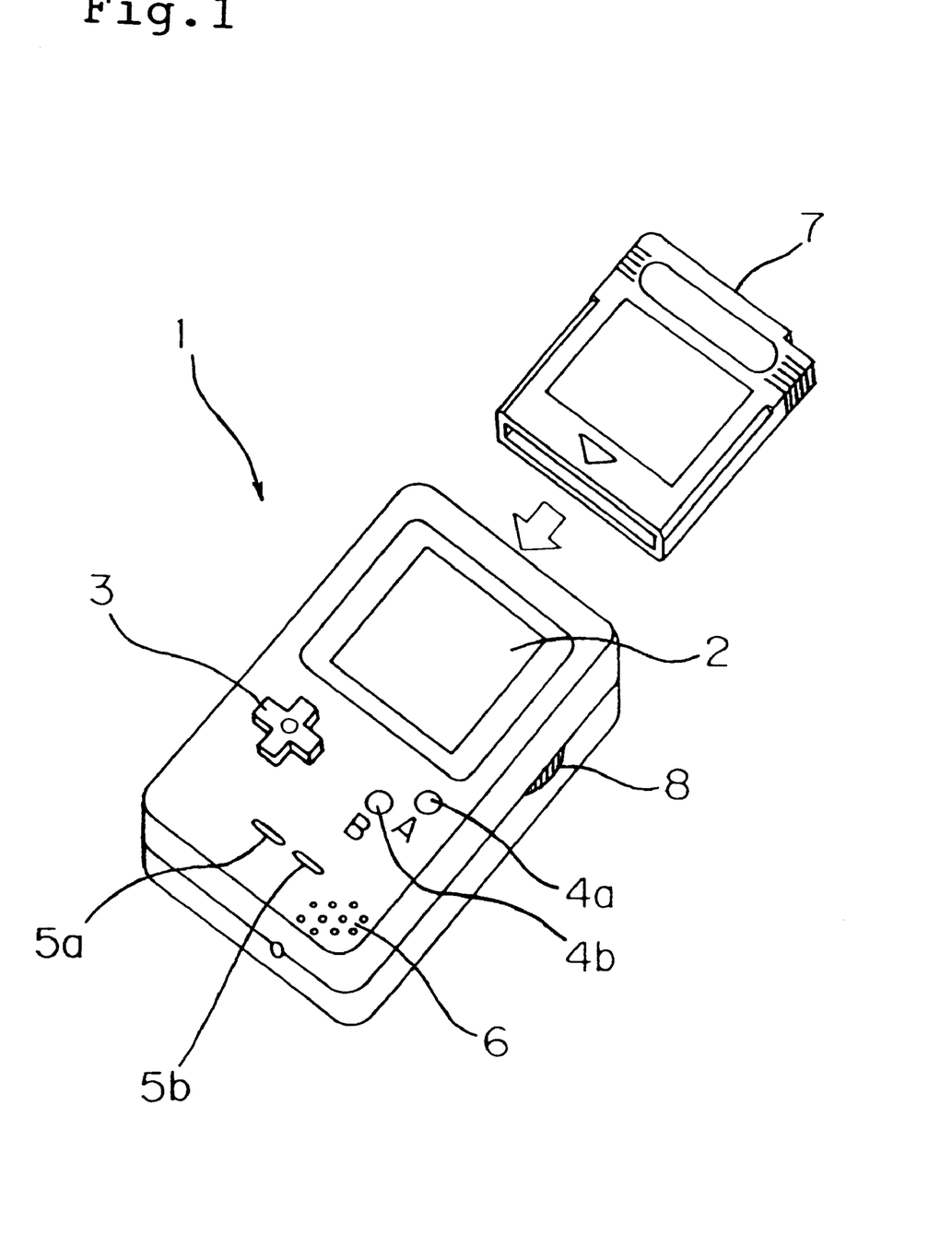
FIG. 1 is a perspective view of a normal hand-held LCD game machine.

According to FIG. 1, the numeral 1 is a hand-held LCD game machine. On the front surface, a LCD panel (2) is prepared to show the development of a game. When the game is operated by hand, a cruciform key (3) controls the shifting direction of a character and a set of movement keys (4a and 4b) instructs various movements for the character. A start switch (5a) and a select switch (5b) are also arranged. This portion equipped with these keys and switches is called as an operating portion. Further in this position, a speaker (6) is also formed to issue sound effects. On the back side, an inserting hole, although it is not shown on the drawing, is established thereof to receive a cassette (7). The casette (7) has a memory cell having a recorded memory of game program data. On both sides, a luminance controller (8) for the display panel (2) and a volume controller (9) are formed. The volume controller can be seen clearly at FIG. 2. A power supply and a power supply switch are omitted.

Figure 2:
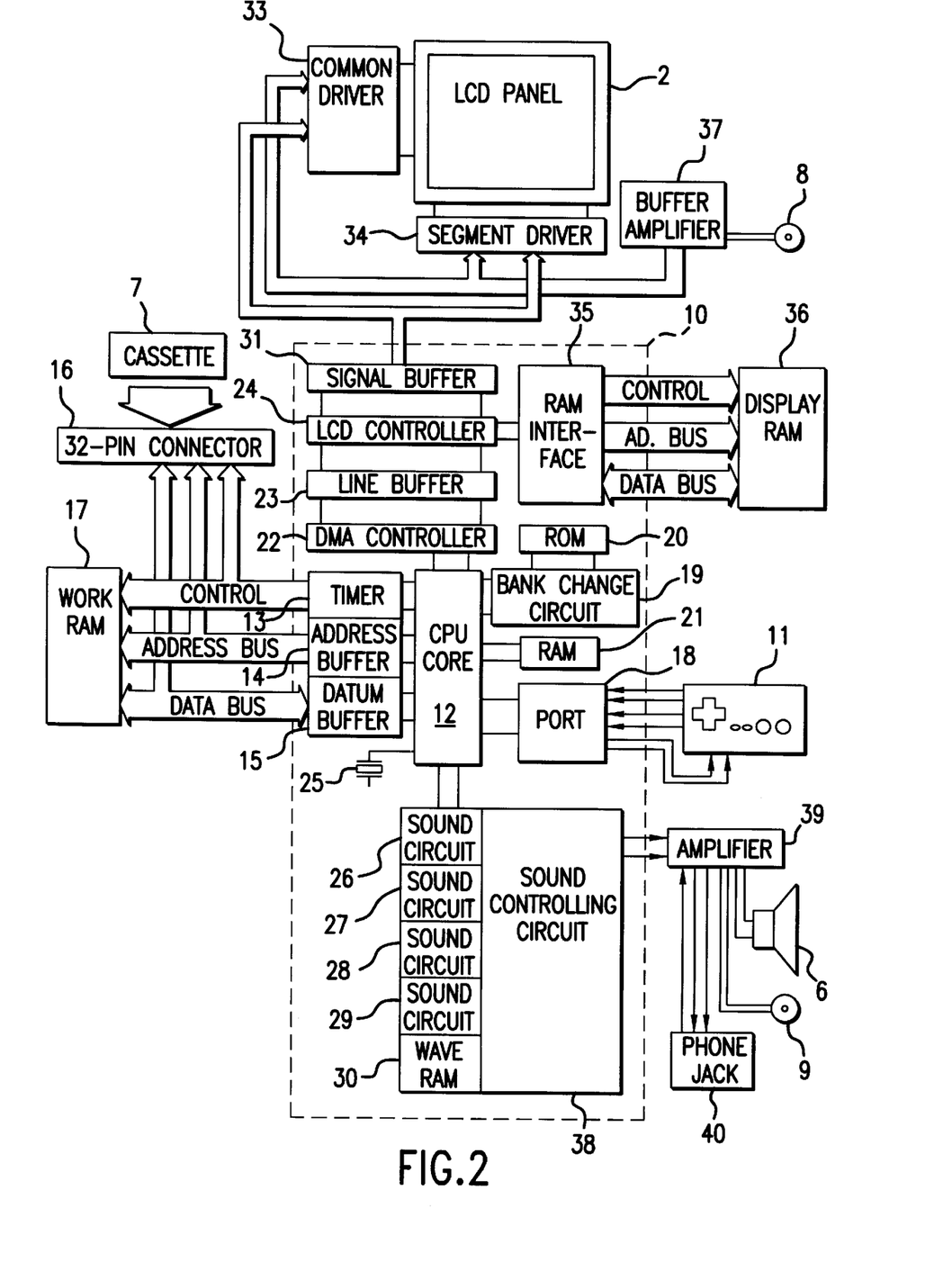
FIG. 2 is a block and circuit diagram of FIG. 1

With reference to FIG. 2, the numeral 10 is a CPU which controls a program data recorded in the cassette (7), a game development on the LCD panel (2) and a sound effect. The CPU (10) has a built-in CPU core (12) which performs arithmetic unit treatment to output its results after receiving various signals. With this CPU core (12) a control line is connected via a timer (13), an address bus (1) and a datum bus (15), and a 32-pin model pin connector (16). A work RAM (17) are also connected via the address bus (14) and the datum bus (15). An operating portion (11) is connected with the core (12) via a port (18). A built-in ROM (20) to be accessed by a memory change signal through a bank change circuit (19) and a built-in RAM (21) are connected with the core (12). A LCD controller (24) is connected with the core (12) via a DMA controller (22) and via a line buffer (23). A clock oscillator (25) is further connected with the core (12) and plural sound circuits (26, 27, 28 and 29) and a wave table RAM (30) are also connected therewith, where different sound signals output by the oscillator (2) are recognized by the sound circuits (26, 27, 28 and 29) and such output sound signals are now decided by the wave table RAM (30). The LCD controller (24) is connected with the LCD panel (2) by a LCD common driver (33) and a LCD segment driver (34) via a drive signal buffer (31), while this controller (24) is also connected with a display RAM (36) which includes a character RAM and V(Video)-RAM through a control line, an address bus and a datum bus via a LCD display RAM interface (35). A luminance controller (8) is connected with the LCD panel (2) by the LCD common driver (33) and the LCD segment driver (34) via a LCD buffer amplifier (37). The sound circuits (26, 27, 28 and 29) and the wave table RAM (30) are connected with a sound controlling circuit (38) which treats with the sound signal, and the sound controlling circuit (38) is connected with the speaker (8), the volume controller (9) and a head phone jack (40) respectively via a sound amplifier (39).

When the cassette (7) is inserted into the game machine (1), an outer ROM within the casette (7) and the CPU core (12) output an indicating datum of the game program data on the LCD controller (24) via the line buffer (23) under the control of the DMA controller (22). When the indicating datum is output by the CPU core (12), the address for the character RAM and the V-RAM is designated in the display RAM (36), a character signal from the character RAM and a object signal from the V-RAM are output, and then these signals are changed into the LCD drive signals by the LCD controller (24). The LCD signals are conveyed to the LCD common driver (33) and the LCD segment driver (34), and then by order of these two drivers (33 and 34), a display image with a display data offered from the CPU core is now shown on the LCD panel (2). This image is now adjusted by the luminance controller (8) via the LCD buffer amplifier (37).

On the other hand, the sound effects are output through the speaker (6) or the head phone jack (40) after the sound signals are formed in the sound circuits (26, 27, 28 and 29) from the clock oscillator (25) and the sound is decided by the wave table RAM (30) and the sound is then treated properly by the sound control circuit (38) and also it is increased by the sound amplifier (39).

Figure 3:
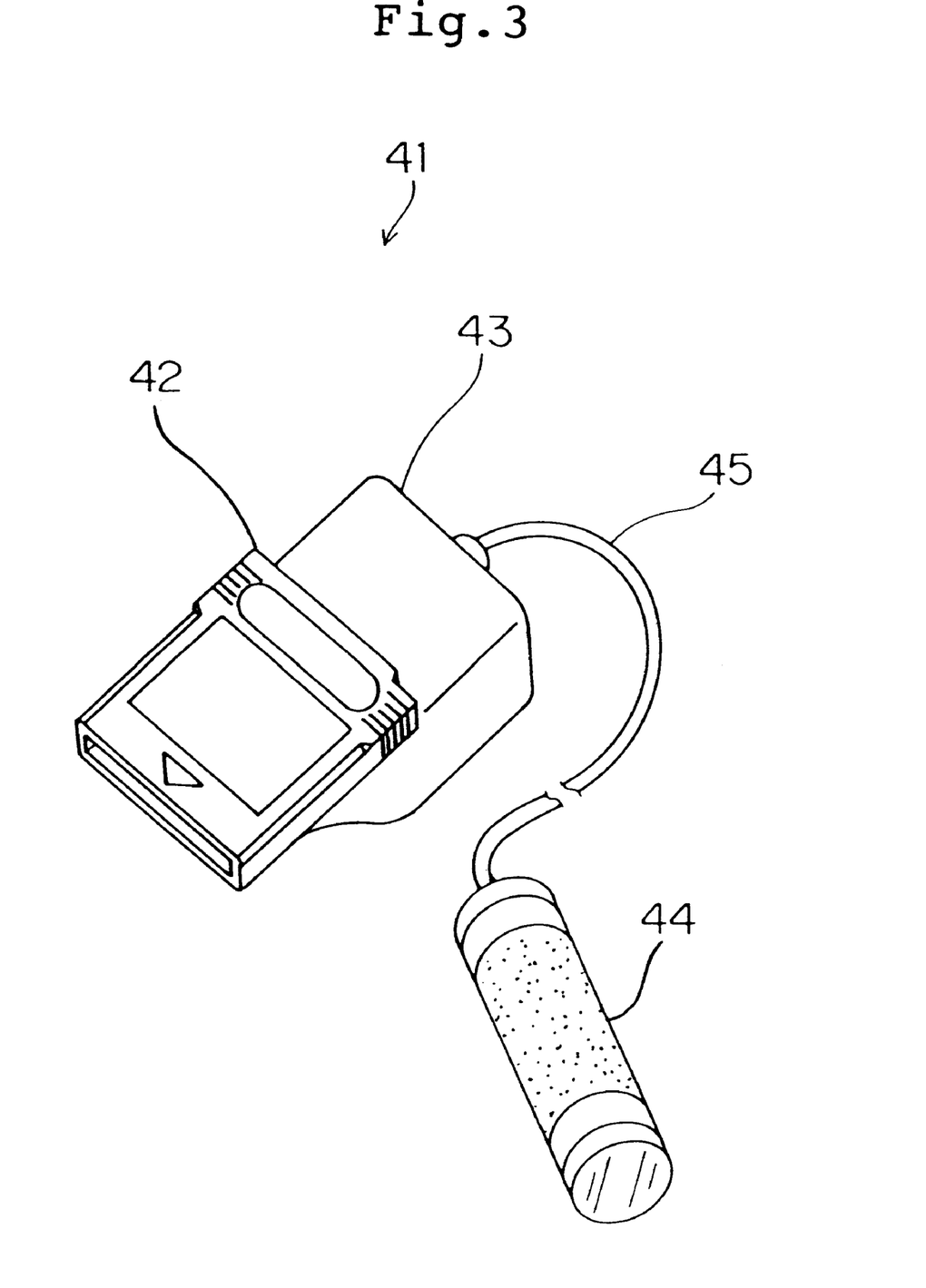
FIG. 3 is a perspective view of a hand-held LCD fish finder developed this invention.
Figure 4:
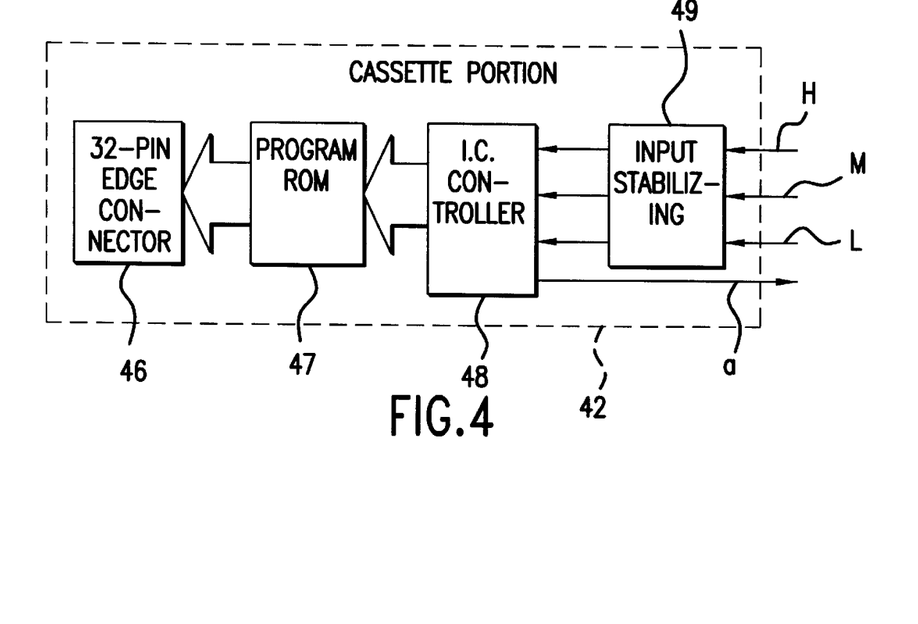
FIG. 4 is a wiring diagram for a cassette as shown in FIG. 3.
Figure 5:
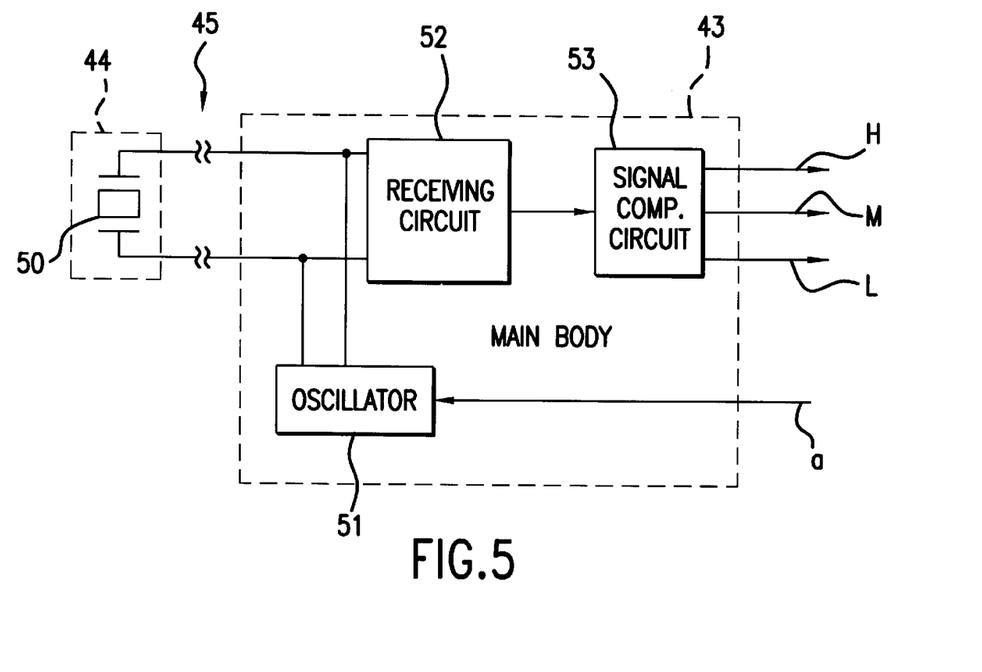
FIG. 5 is a wiring block diagram for a fish float sensor connected with a fitting device as shown in FIG. 3.

With reference to FIG. 3, FIG. 4 and FIG. 5, the numeral 41 is a fitting device which comprises a fitting portion composed of a cassette portion (42) and a main body (43), and which also comprises a cable (45) connecting a fish float sensor (44) and the main body (43), and thus this fitting device (41) works as a fish finder in this hand-held LCD game machine. This cable (45) is covered with foamed plastic material, so that the cable (45) may float on the water. As preferable material for this cable cover, urethane cover with outer diameter of 4.0 mm and with two shield cores of 0.7 mm diameter inserted therein is adopted. The cassette portion (42) is exactly in the same shape and form as the normal cassette which is inserted into the hand-held LCD game machine (1), and the portion (42) is equipped with a 32-pins edge connector (46) which should be connected with the 32-pins connector (16) and a program ROM (47) which has a memory program to display the topography of the water bottoms and fishes on the LCD panel (2) of the game machine (1) after receiving an echo of a signal issued by the float sensor (42). An IC controller (48) is also built in the portion (42), and the IC controller (48) controls the echo signal and the program ROM (47) as well as outputs a timing signal (a). In order to stabilize the echo signal to be input into the cassette portion (42), an input signal stabilizing circuit (49) is also prepared. On the other hand, in order to oscillate an ultrasonic acoustic wave and to receive the echo signal, an ultrasonic transmitter (50) is built in the fish float sensor (44).

In the main body (43), an oscillator circuit (51) which generates the ultrasonic wave after receipt of the timing signal (a) from the IC controller (48), a receiving circuit (52) which receives the echo issued by the ultrasonic transmitter (50) and changes it into the echo signal, and a signal-comparative circuit (53) which allots the marks of "H", "M" and "L" for the received echo signal at the signal receiving circuit (52) and which outputs those marks to the input signal stabilizing circuit (49) are established.

When the cassette portion (42) of the fitting device (41) is inserted into the game machine (1), the fish float sensor is placed onto the water, and the power switch of the game machine (1) is turned on, and the cruciform key (3) is operated to select the fish finding mode, and finally the start switch (5a) is pushed on. The "fishes finding program" stored in the program ROM (47) displays the topography of the water bottom and fish.

Figure 6:
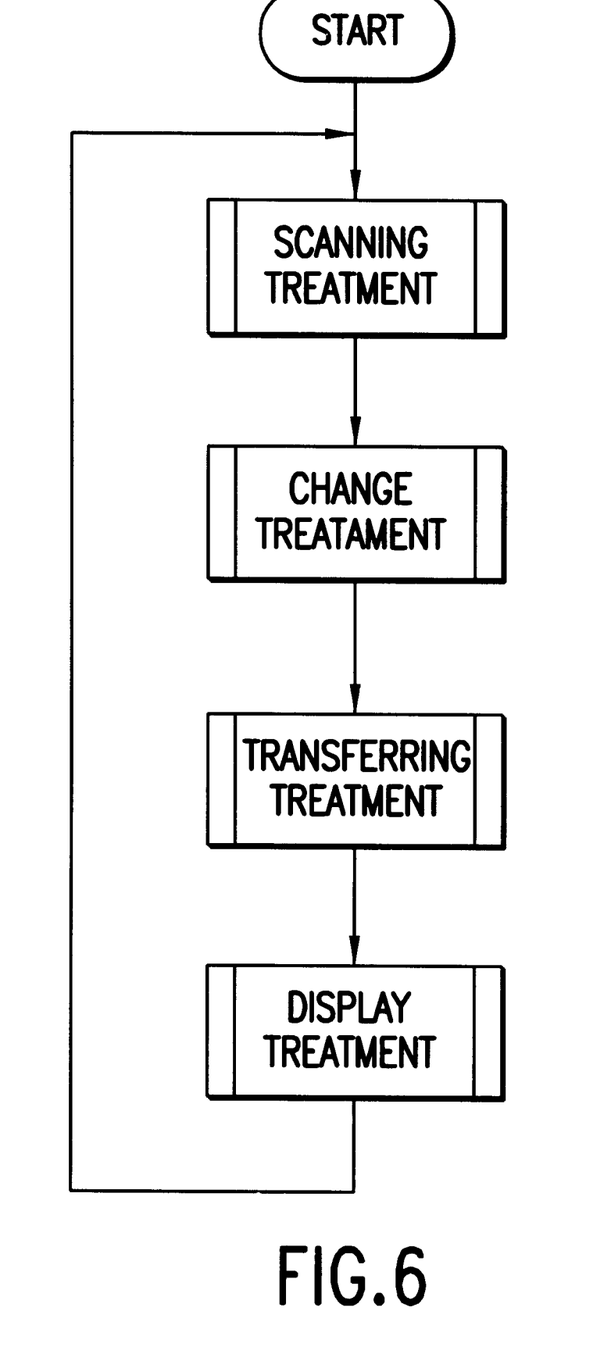
FIG. 6 is a flow chart explaining a program to indicate a topography of water bottoms and existence of fishes operated by the present fish finder developed by this invention.

With reference to FIG. 6, the fish finding program is composed of four treatments. The first is a scanning treatment with which data obtained by the ultrasonic transmitter (50) are stored into the work RAM (17). The second is a change treatment with which the data of the work RAM (17) are changed into dots by the CPU core (12). The third is a transferring treatment with which the changed data are transferred into the display RAM (36), while the fourth is a display treatment with which the data are displayed on the LCD panel (2).

Figure 7:
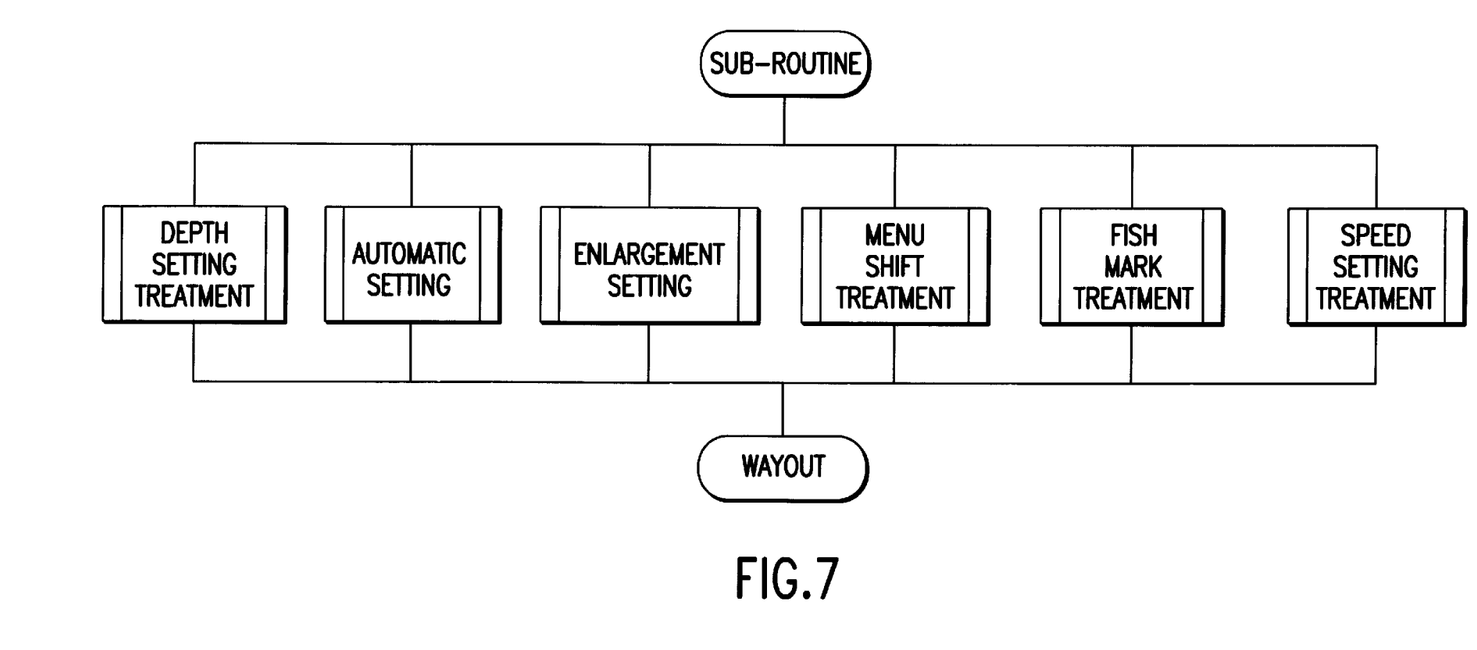
FIG. 7 is a flow chart explaining another program to indicate a topography of water bottoms and existence of fishes operated by the present fish finder developed by this invention.

When these treatments are performed, as shown in FIG. 7, through an interrupt sub-routine, between the above treatments, the water bottom is obtained and an input treatment is performed after receiving various operative signals from the operating portion (11).

Figure 10:
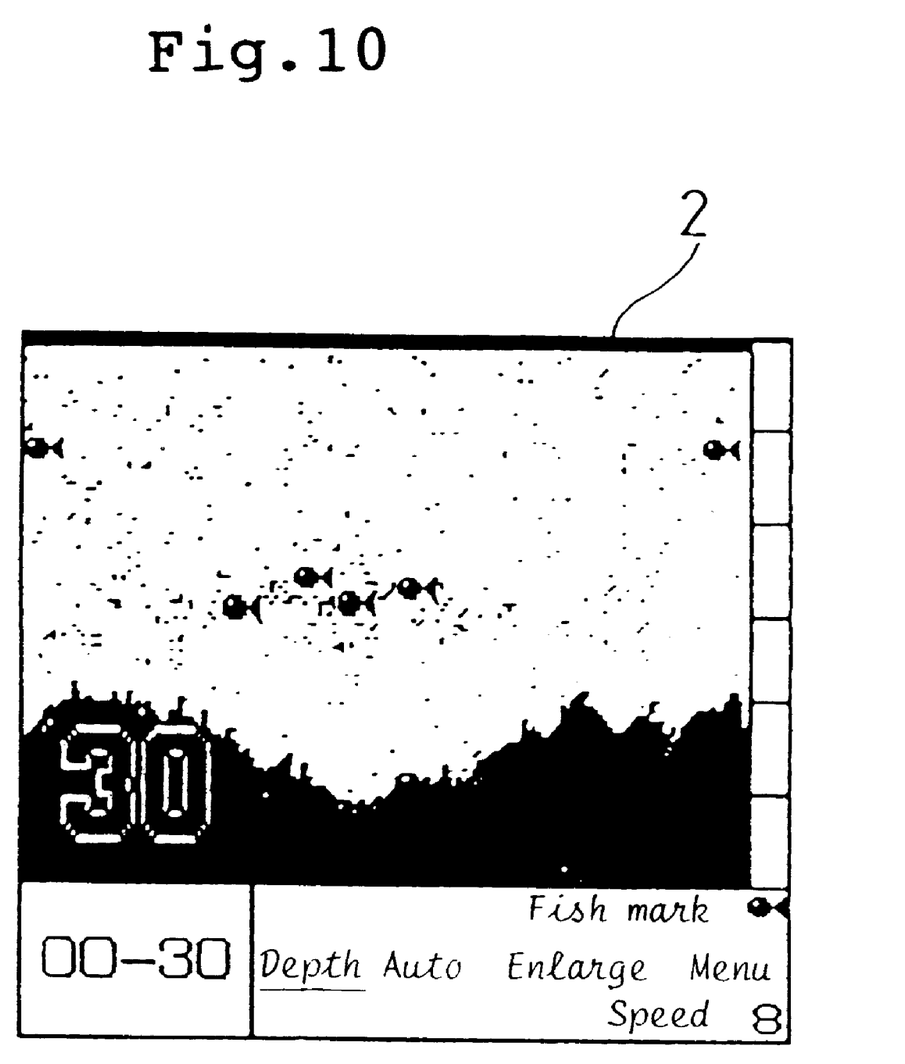
FIG. 10 is an example of the display indicated on a LCD panel portion developed by the present embodiment.

In this subroutine, a depth setting treatment is performed in the method that the cruciform key (3) is operated to register a cursor with "Depth" of the display in finding mode shown on the LCD panel (2) and at the same time the select switch (5b) is pushed on, and then the movement keys (4a and 4b) are properly operated to set up the required distance. Then the set point of the required depth can be obtained, and this required distance is read in the memory as one line. This treatment to set up the depth can be seen in FIG. 10, where on the display the setting depth 30 meter deep is shown clearly.

In an automatic setting treatment, when the cursor is registered with an automatic position and the select switch (5b) is pushed on, an automatic selection for the depth can be performed from plural depth grades which are predetermined based on the values supplied by a sonar.

In an enlargement treatment, when the cursor is registered with an enlargement position and the select switch (5b) is pushed on, the half distance from the bottom is displayed on the LCD panel in the enlarged manner.

In a menu shift treatment, when the cursor is registered with a menu shift position and the select switch (5b) is pushed on, the display of the LCD panel (2) is changed into another mode to be selected such as dictionary mode to distinguish the kind of fishes or normal game mode. The decision of these different modes may be operated by the movement keys (4a and 4b) accordingly.

In a fish mark treatment, when the cursor is registered with a fish mark position and the select key (5b) is pushed on, the selection display shows how to display the fish by dots or by fish marks, and then the movement keys (4a and 4b) are operated how to select this display of the obtained fish.

In a speed treatment, when the cursor is registered with a speed position and the select key (5b) is pushed on, the selection speed shows how to select the speed showing the display to scroll toward the left, and then the movement keys (4a and 4b) are operated to obtain the required speed where the display scrolls toward the left by one line unit.

Figure 8:
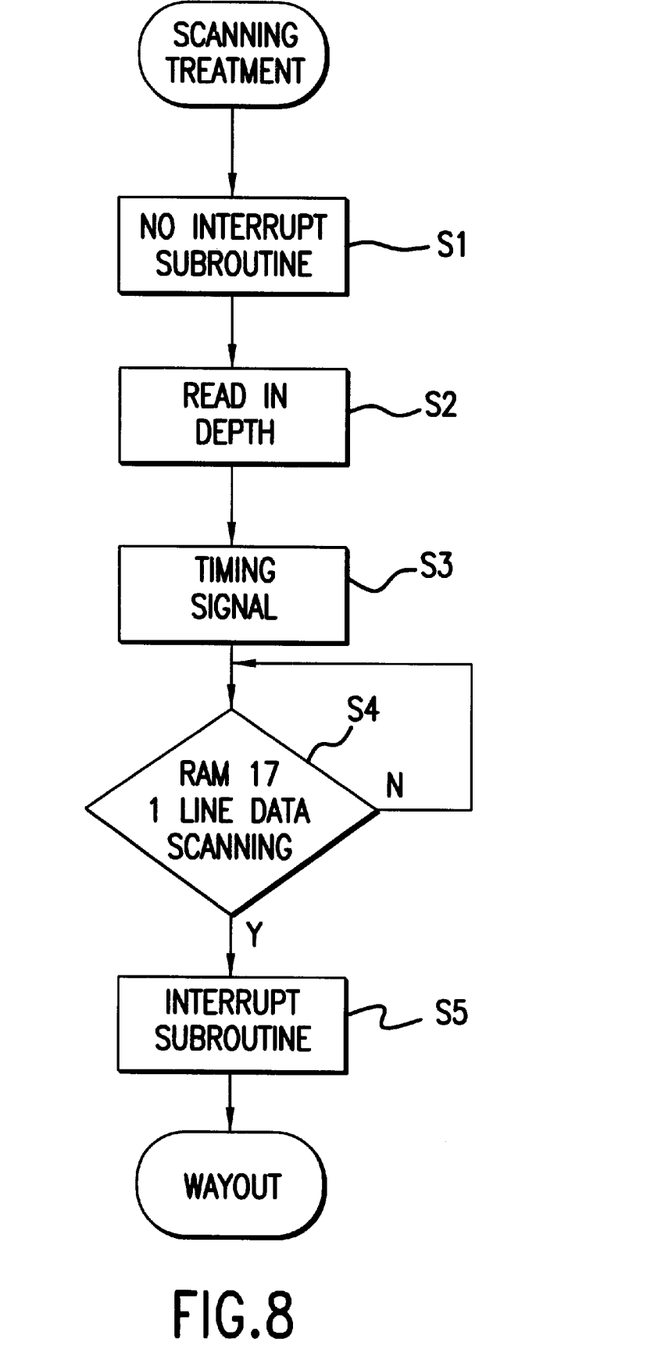
FIG. 8 is a flow chart explaining the other program to indicate a topography of water bottoms and existence of fishes operated by the present fish finder developed by this invention.

According to FIG. 8, with regard to the scanning treatment, a step (S1) forbids the interruption of the subroutine, and a step (S2) promotes to read in the depth distance into the work RAM (17), while a step (S3) outputs the timing signal (a) to the oscillator circuit (51) from the control IC (48). The oscillator circuit (51) after receipt of the timing signal (a) offers an ultrasonic acoustic wave and also receives a returned echo into the receiving circuit, and then the echo is classified into three signals (H, M and L) or without signal by the signal-comparative circuit (53) and finally it is stored into the work RAM (17) via the input signal stabilizing circuit (49). Continuously, a step (S4) judges whether the work RAM (17) scans the data for one line unit, and when this scanning is confirmed, a step (S5) permits the interruption of the subroutine performance. The mark "Y" means "Yes", while the mark "N" means "No", and when the mark "N" appears, the procedure returns to the previous step.

Figure 9:
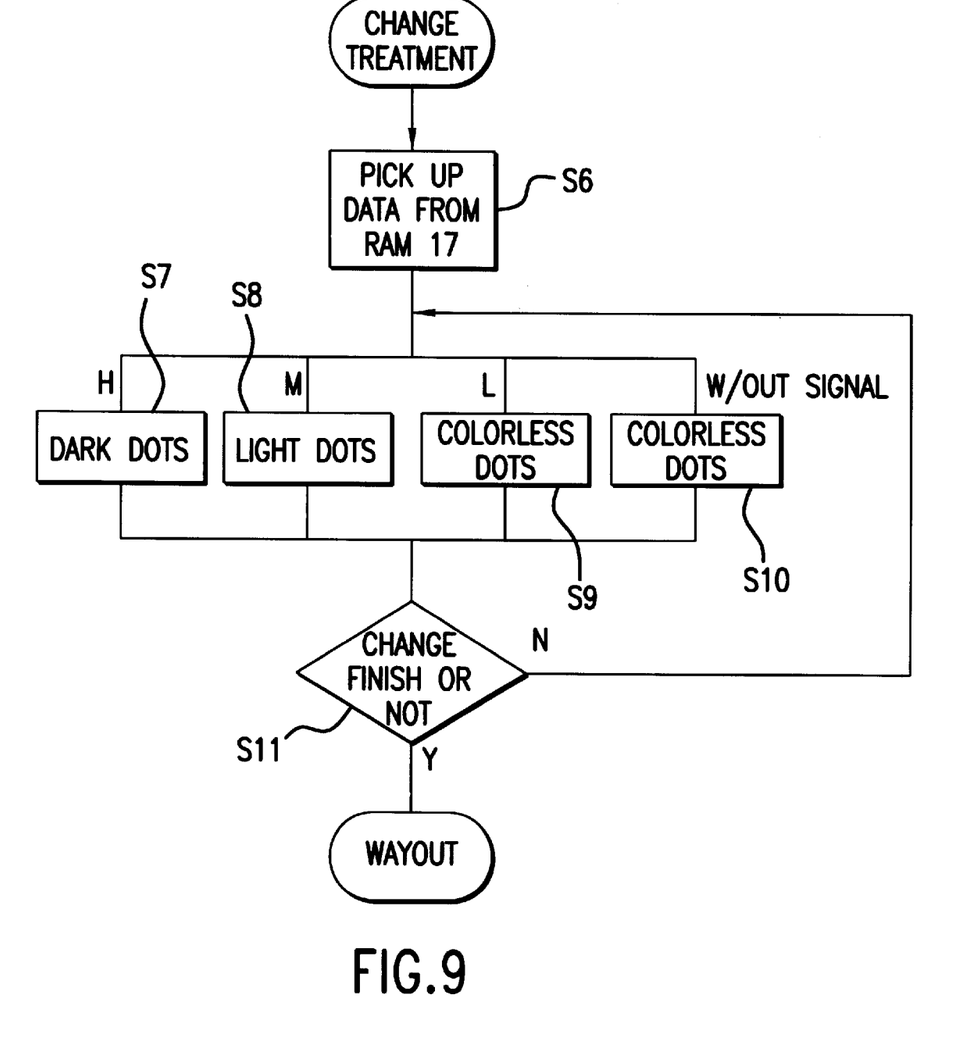
FIG. 9 is a flow chart explaining an additional program to indicate a topography of water bottoms and existence of fishes operated by the present fish finder developed by this invention.

Now, with reference to FIG. 9, with regard to the change treatment, under the control of the CPU core (12), by a step (S6) each datum of H, M, L, or without signal corresponding to the depth of one line unit stored in the work RAM (17) is now picked up, and by a step (S7) the datum is changed into dots to be displayed on the LCD panel. Namely, by this step (S7), H datum is changed into dark dots, M datum into light dots, while L datum is changed into colorless dots by a step (S9) and the non-signal is also changed into colorless dots by a step (S10) respectively. By a step (S11) this treatment is performed at one line unit.

With regard to the transferring treatment, the indicated dots data are transferred into the V-RAM in the display RAM (36), and as explained for the display treatment aforesaid, the indicated dots data output by the CPU core designate the address of the character RAM in the display RAM (36) and also the address of the V-RAM, and then a character signal from the character RAM and an object signal from V-RAM are output. These signals are changed into the drive signals by the LCD controller (24), and the LCD drive signals are offered to the LCD common driver (33) and the LCD segment driver (34) via the LCD drive signal buffer (31), and thus by these two drivers (33 and 34) the topography of the water bottom and fish in accordance with the indicated data for one line unit are displayed on the LCD panel (2).

In this way, the scanning treatment is again performed after one line unit is scrolled away.

In the present invention, in stead of the cassette (7) to be inserted into the hand-held LCD game machine (1), the cassette portion (42) which is exactly as the same type and shape of the cassette (7) and is also built in the ROM having a memory cell of the fish finder is now inserted, so that the topography of the water bottom and fish are displayed on the LCD panel (2) based on the echo signals of the ultrasonic transmitter (50). In this constitution, fishing can be enjoyed with feeling of playing the game under the simple operation, and at the same time, the present fish finder is very small and in light weight suitable for carrying, so that this machine can be used at any place with ease.

When the fishing float sensor (44) is placed on the water, the cable (45) which connects the main body (43) with the sensor (44) floats on the water.

As explained so far, this invention can provide the hand-held LCD fish finder which can be installed with the normal hand-held LCD game machine, and therefore it is not necessary to purchase an expensive fish finder for lovers of fishing.

At the same time, the user of this machine can enjoy both the normal games function as the original purpose and the fish finder function in a easy-portable way.

It is further understood by those skilled in the art that the foregoing description is a preferred embodiment of the disclosed matter and that various changes and modifications may be made in the invention without departing from the spirit and scope thereof.

What is claimed is:

1. A LCD fish finder comprising in combination:
    a hand-held LCD game machine which receives game cassette cartridges, which is equipped with a memory cell of program data inserted, and which develops a game on a LCD display panel, and which has a cassette connector;
    a fitting device adapted to be inserted into said cassette connector;
    a fish float equipped with an ultrasonic transmitter;
    the fitting device comprising a fitting portion composed of a cassette portion and a main body;
    a memory cell is built in the fitting portion; and
    the memory cell having a program to display topography of water bottom and fish in water on the LCD panel based on a sonar signal issued by the ultrasonic transmitter and transferred to the fitting portion.

2. An LCD fish finder according to claim 1, wherein the fitting portion and a fish float equipped with an ultrasonic transmitter are connected by a cable which is covered with foamed plastic for floating over water.

3. An LCD fish finder according to claim 1, wherein said fish finder is hand held.

* * * * *